United States Patent [19]

Taylor

[11] 4,210,856
[45] Jul. 1, 1980

[54] BATTERY CHARGING SYSTEMS FOR ROAD VEHICLES

[75] Inventor: Joseph D. F. Taylor, Kidderminster, England

[73] Assignee: Lucas Industries Limited, Birmingham, England

[21] Appl. No.: 888,274

[22] Filed: Mar. 20, 1978

[30] Foreign Application Priority Data

Apr. 2, 1977 [GB] United Kingdom ............... 14014/77

[51] Int. Cl.² ............................................. H02J 7/14
[52] U.S. Cl. ........................................ 320/17; 320/61; 363/59
[58] Field of Search .................... 320/6, 15, 17, 39, 40, 320/59, 61; 322/28; 363/22, 23, 59

[56] References Cited

U.S. PATENT DOCUMENTS

| | | | |
|---|---|---|---|
| 3,151,287 | 9/1964 | Pintell | 363/22 |
| 3,667,025 | 5/1972 | Campbell et al. | 320/40 X |
| 3,671,843 | 6/1972 | Huntzinger et al. | 320/40 X |
| 3,900,784 | 8/1975 | Seike | 320/39 X |

Primary Examiner—Robert J. Hickey
Attorney, Agent, or Firm—Ladas, Parry, Von Gehr, Goldsmith & Deschamps

[57] ABSTRACT

A road vehicle battery charging system for a dual voltage electrical supply includes a conventional alternator/rectifier assembly for charging the main battery and a d.c. to d.c. converter connected to charge an auxiliary battery in series with the main battery. The converter includes an autotransformer with primary windings in series with respective transistors across the main battery and further windings connecting the transistor collectors in series with diodes to the auxiliary battery. The transistors form part of an oscillator which produces an a.c. waveform with a peak-to-peak voltage slightly less than twice the main battery voltage—the deficiency being made up by virtue of the further windings.

11 Claims, 1 Drawing Figure

U.S. Patent
Jul. 1, 1980
4,210,856
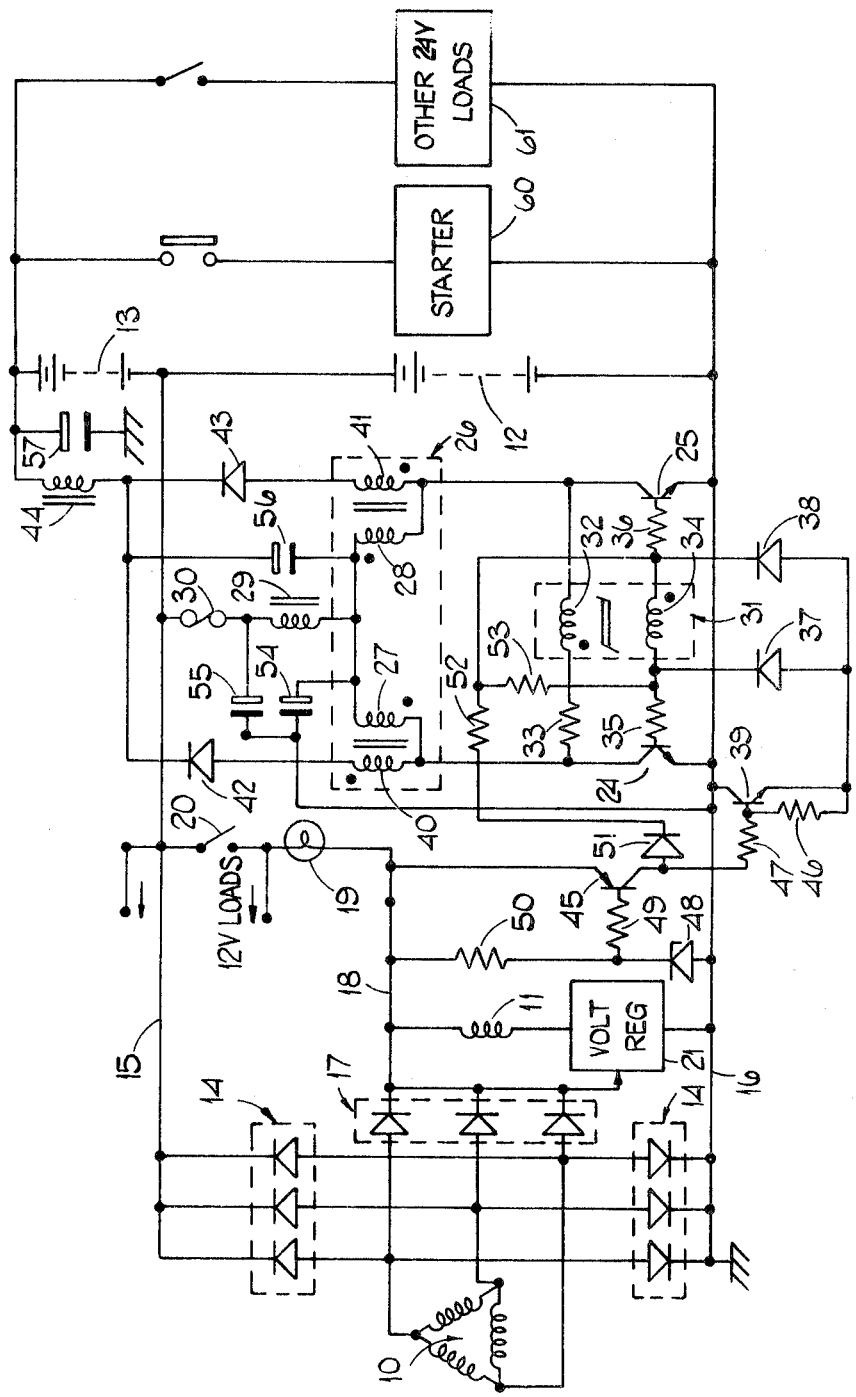

BATTERY CHARGING SYSTEMS FOR ROAD VEHICLES

This invention relates to battery charging systems for road vehicles.

Vehicle electrical systems have already been proposed in which there are main and auxiliary batteries, one of which is used for normal vehicle loads, e.g. lighting and ignition, and the other of which is used in series with the first mentioned battery to provide a higher voltage supply for engine starting and other purposes.

There have been several suggestions for charging the auxiliary battery including transformer coupling of a rectifier to the output of an alternator which is coupled by another rectifier to the main battery. Another prior proposal makes use of a known type of diode/capacitor voltage doubler arrangement but neither of these two arrangements is fully satisfactory.

It has also been proposed to utilize a d.c. to d.c. converter for charging the auxiliary battery but the prior proposed circuits have tended to be complex and have needed a relatively expensive output transformer for providing the voltage step-up. It is an object of the present invention to provide a battery charging system of the general kind referred to above including a simple and effective d.c. to d.c. converter for charging the auxiliary battery.

A battery charging system in accordance with the invention comprises an alternator, a rectifier connecting the alternator to a main battery for charging thereof by the alternator, and d.c. to d.c. converter connecting the main battery to an auxiliary battery which is in series with the main battery, the d.c. to d.c. converter including an autotransformer having a pair of main windings, each connected at one end to one terminal of the main battery and connected at their other ends through respective semi-conductor switching elements to the other terminal of the main battery, said switching elements forming part of an oscillator so that the switching elements are turned on alternately, and at least one further winding connected in series with a diode between said other end of one of the main windings and a terminal of the auxiliary battery.

Preferably there are two such further windings each with an associated diode and associated respectively with the two main windings.

An example of the invention is shown in the accompanying drawing which is the circuit diagram of the battery charging system.

As shown in the drawing an alternator having a stator winding 10 and a rotatable field winding 11 is used for charging both a main battery 12 and an auxiliary battery 13. A main rectifier 14 connects the alternator output to a main supply rail 15 and an earth return 16 across which the main battery 12 is connected. An auxiliary rectifier 17 connects the output of the alternator to another rail 18, connected via an ignition warning lamp 19 and an ignition switch 20 to the rail 15. When the alternator is running normally the rail 18 is at the same voltage as the rail 15 so that the lamp 19 is extinguished in known manner. The field winding 11 is connected in series with a voltage regulator 21 in known manner between the rail 18 and the earth return 16.

For charging the auxiliary battery 13 there is provided a d.c. to d.c. converter including two semi-conductor switching elements in the form of npn transistors 24, 25. Each such transistor has its emitter connected to the earth return 16. An autotransformer 26 has two main windings 27, 28 having equal numbers of turns, and one end of each such main winding is connected to the collector of an associated one of the transistors 24, 25. The other ends of the main windings 27, 28 are connected together and, via a choke 29 and a fuse 30 in series, to the rail 15.

The transistors 24, 25 form part of an oscillator in which feedback is provided by a saturable core transformer 31. The primary winding 32 of this transformer 31 is connected in series with a resistor 33 between the collectors of the transistors 24, 25 and the two ends of the secondary winding 34 of the transformer 31 are connected by resistors 35, 36 to the bases of the transistors 24, 25 respectively. The ends of the secondary winding 34 are also connected to the cathodes of a pair of diodes 37, 38 which have their anodes connected to the emitter of an npn transistor 39 having its collector connected to the earth return 16.

Assuming for the moment that the transistor 39 is conductive and the oscillator is running when the transistor 24 is turning on current flows through the winding 27 inducing a voltage at the collector of the transistor 25 which is higher than the voltage on the rail 15. Current thus flows through the primary winding 32 of the transformer 31 inducing a voltage in the secondary winding 34 causing current to flow through the resistor 35, the base-emitter of the transistor 24, the collector emitter of the transistor 39 and the diode 38. This current acts to turn the transistor 24 on harder. When the transformer 31 saturates feedback ceases, transistor 24 starts to turn off, so that the current flowing in the primary of the transformer 32 reverses and transistor 25 starts turning on. The collector of the transistor 24 then assumes the higher voltage.

Because of the effect of losses in the fuse 30, the inductor 29, the autotransformer 26 and the transistors 24 and 25, the peak-to-peak voltage at the collectors of the transistors 24, 25 is in fact somewhat less than twice the voltage between the rails 15 and the earth return 16. To make up this deficiency further windings 40, 41 of the auto-transformer 26 are each connected at one end to the collector of the associated transistor 24 or 25 and the other ends of these further windings 40, 41 are connected to the anodes of two diodes 42, 43 with their cathodes connected together and via a further choke 44 to the positive terminal of the battery 13. In a typical application the main windings 27, 28 may each have 17 turns whilst the further windings 40, 41 have only two turns each.

The transistor 39 is used for stopping oscillation of the d.c. to d.c. converter by interrupting the current paths for the feedback current from the transformer 31. The transistor 39 is controlled by a pnp transistor 45, its base being connected by a resistor 46 to its own emitter and by a resistor 47 to the collector of the transistor 45. The base of the transistor 45 is connected by a resistor 49 to the cathode of a zener diode 48 which has its anode connected to the earth return 16. The cathode of the zener diode 48 is also connected by a resistor 50 to the rail 18, to which the emitter of the transistor 45 is also connected. The transistor 45 conducts only when the voltage on the rail 18 is sufficiently high to break down the zener diode 18. When transistor 45 is conductive, transistor 39 can turn on to conduct the feedback current as hereinbefore described. When the voltage on rail 18 is too low to break down the zener diode 48, the transistor 45 is off and transistor 39 cannot conduct thereby interrupting the feedback current and preventing the oscillator from running.

The collector of the transistor 45 is also connected to the anode of a diode 51 which has its cathode connected by a resistor 52 to the end of the secondary winding 34 which is connected to the resistor 36. A resistor 53 interconnects the ends of the secondary winding 34. These two resistors 52, 53 ensure that the oscillator starts running whenever the transistor 45 turns on, by ensuring that transistor 25 is more heavily biased than transistor 24.

The chokes 29, 44 form part of two filter circuits which prevent the oscillating signals generated within the d.c. to d.c. converter from being superimposed on battery voltages. To this end the choke 29 is associated with two capacitors 54, 55 connecting its two ends to the earth return 16. The choke 44 is associated with a capacitor 56 connected between one end of the choke 44 and the interconnection of the main windings 27, 28 and with a capacitor 57 connected between the other end of the choke 44 and the earth return 16.

As is usual there are connections from the battery 12 and from the ignition switch 20 for 12 V loads which are respectively independent of and dependent on the ignition switch (e.g. the ignition and the lighting respectively).

The battery 13 is used mainly for starting and the drawing shows the starter circuit 60 connected across the series combination of the two batteries 12, 13. In addition, other loads, such as a trailer lighting system may be connected across the series combination of the two batteries 12, 13.

Where there is to be a high current demand on the auxiliary battery 13 it may be economically preferable to use two or more d.c. to d.c. converters operating in parallel to charge the battery 13, rather than attempting to increase the current rating of the converter. In this case the switching circuit consisting of the zener diode 48, the transistors 39 and 45, the diode 51, and the resistors 46, 47, 49 and 50 need not be duplicated but can be common to both (or all) the d.c. to d.c. converters.

I claim:

1. A battery charing system for a road vehicle comprising an alternator, a rectifier connecting the alternator to a main battery for charging thereof by the alternator, a voltage regulator connected to the alternator and operating to control the output voltage of the alternator, and a d.c. to d.c. converter connecting the main battery to an auxiliary battery which is in series with the main battery, the d.c. to d.c. converter including a pair of semi-conductor switching elements, an auto-transformer having a pair of main windings, each connected at one end to one terminal of the main battery and connected at its other end through a respective one of said semi-conductor switching elements to the other terminal of the main battery, said switching elements forming part of an oscillator so that the switching elements are turned on alternately, a diode, and at least one further winding connected in series with said diode between said other end of one of the main windings and a terminal of the auxiliary battery.

2. A battery charging system as claimed in claim 1 in which there are two of said further windings each of which is connected at one end to said other end of an associated one of the main windings and at the other end via an associated diode to the auxiliary battery terminal.

3. A battery charging system as claimed in claim 1 in which the or each said further winding has only a few turns as compared with the main windings and acts to compensate voltages losses in the main windings and semi-conductor switching elements causing the amplitude of the alternating voltage across each main winding to be less than the main battery voltage.

4. A battery charging system as claimed in claim 1 in which the oscillator comprises a pair of transistors constituting said switching elements having their emitters connected to said other terminal of the main battery and their collectors connected to the respective main windings, a feedback transformer having a primary winding connected between the collectors of said transistors and a secondary winding connected between the bases of said transistors, and a pair of further diodes connecting opposite ends of said secondary winding of the feedback transformer to said other terminal of the main battery.

5. A battery charging system as claimed in claim 4 further comprising a switching transistor having its collector-emitter path in series with said further diodes and means sensitive to the alternator output voltage controlling conduction of said switching transistor for inhibiting operation of the d.c. to d.c. converter when the alternator output voltage is below a predetermined level.

6. A battery charging system as claimed in claim 5 in which said alternator output voltage sensitive means comprises a further transistor having its emitter connected to the alternator output via an auxiliary rectifier and its collector connected to the base of the switching transistor and voltage sensitive means across the collector-emitter of the further transistor and connected to the base thereof for turning on the further transistor when the voltage exceeds said predetermined level.

7. A battery charging system as claimed in claim 6 further comprising a diode and resistor means connecting the collector of said further transistor to the bases of the transistors of said oscillator so as to apply unequal bias thereto.

8. A battery charging system as claimed in claim 1 further comprising filter means connecting said further winding to the auxiliary battery, such filter means comprising a choke interposed between the diode and the auxiliary battery and a capacitor connecting one end of said choke to said other terminal of the main battery.

9. A battery charging system as claimed in claim 8 also including further filter means including a further choke connecting said one terminal of the main battery to the main winding of said auto-transformer and a pair of capacitor connecting opposite ends of said further choke to said other terminal of the main battery.

10. A battery charging system as claimed in claim 9 also including a further capacitor connecting the interconnection between said first-mentioned choke to said diode to the interconnection between said further choke and the main winding.

11. a battery charging system for a road vehicle comprising the combination of an alternator, a rectifier connecting the alternator to a main battery for charging thereof by the alternator, a voltage regulator connected to the alternator and controlling the output voltage of the alternator, and a d.c. to d.c. converter connecting the main battery to an auxiliary battery which is in series with the main battery, said converter including a transformer having input windings and output windings, a first choke connecting a common point on said input windings to one terminal of the main battery, a first pair of capacitors connecting opposite ends of said first choke to the other terminal of the main battery, an oscillator circuit connecting said input windings to the other terminal of the main battery and including a pair of switching elements which are turned on and off alternately, diode means connecting the output windings to an output terminal, a second choke connecting said output terminal to the auxiliary battery, and a second pair of capacitors one of which connects said output terminal to said common point on the input windings and the other of which connects the other end of the second choke to said other terminal of the main battery.

* * * * *